United States Patent Office 3,522,209
Patented July 28, 1970

3,522,209
INCORPORATION OF WATER INSOLUBLE ADDITIVES INTO AQUEOUS POLYMER SOLUTION
Lin-Fa Lee, Seaford, Del., assignor to E. I. du Pont de Nemours and Company, Wilmington, Del., a corporation of Delaware
No Drawing. Filed Dec. 7, 1966, Ser. No. 599,717
Int. Cl. C08g 51/58
U.S. Cl. 260—45.95                    2 Claims

ABSTRACT OF THE DISCLOSURE

Water-insoluble, melt-compatible additives, e.g., antioxidants, can be readily dispersed in aqueous polyamide-forming solutions which are at high temperature and pressure, by incorporating the additives in said solutions as a suspension in another aqueous solution of the same polyamide-forming salt, wherein the salt is present in an amount within 5% by weight of the concentration at which the specific gravity of the suspension medium is equal to the specific gravity of the additive.

---

This invention relates to an improved intermediate additive composition and an improved process for the incorporation of aqueous suspensions of additives during the melt-polymerization of synthetic, linear polyamides.

Additives are incorporated into polycarbonamides to improve the thermal, light and oxidative stability of filaments and fibers spun therefrom. The additives, when introduced into a melt, cannot be subject to thermal degradation at the high melt-polymerization temperatures. Additionally, the additives must have a volatility sufficiently low to prevent loss during later stages of polymerization. Polynuclear polyphenols, such as those described in U.S. Pats. 3,026,264 and 3,062,895 are particularly suitable to incorporation during melt-polymerization. These particular antioxidants are compatible with and soluble in the polycarbonamide melt, but under normal conditions are highly insoluble in water. Such solids are difficult to disperse in aqueous mediums. When the process is carried out in a similar manner attempting to add the phenolic antioxidant suspended only in water, difficulties are encountered in plugging of transfer lines used to introduce the suspension, as a result of the rapid settling rate. Because of the difficulties, misprocessing results and the polymer batch must be discarded.

In accordance with this invention there is provided an improvement in the process of preparing a nylon polymer containing a water-insoluble, melt-compatible additive, comprising adding to an aqueous nylon salt solution under high temperature and pressure, within a period from immediately prior to polymerization to before reduction to ambient atmospheric pressure, a suspension of an additive in solid particulate form in an aqueous solution of the same nylon salt. The amount of the nylon salt in the dispersion is within 5% by weight of the concentration at which the specific gravity of the aqueous solution is equal to the specific gravity of the additive.

Preferably, the additives used in the processes of this invention are organic, water-insoluble and high-melting. By "high-melting" it is meant that the additives have a melting point above 100° C. but below that of the polycarbonamide melt in which they are incorporated. They are soluble in the polycarbonamide melt and consequently become dissolved therein and uniformly distributed throughout during the subsequent continuing polymerization reaction.

The salt solutions used as the suspension medium are concentrated aqueous solutions of the diammonium salt formed between the diamine and dicarboxylic acid from which the polycarbonamide is prepared. The salts are commonly known as nylon salts.

The suspension of the additive may be prepared in any convenient manner. A convenient method of preparation is simply to mix the powdered additive with the concentrated nylon salt solution in water plus a small amount of a wetting or dispersing agent in a high-speed and high-shear mixer or blender or in a conventional dispersing mill. Particle size of the additive is not critical provided it is in a reasonably small particle size for convenient handling, preferably less than one millimeter.

The principal factor in obtaining maximum stability of the suspension is to adjust the concentration of the salt solution such that the suspended additive particles tend to remain suspended with a significant tendency neither to settle nor to float. If the concentration of the salt becomes too high the particles rapidly tend to float. If plain water or a too dilute salt solution is employed the particles rapidly tend to settle out. Maximum stability is attained by adjusting the concentration such that the specific gravity of the salt solution and of the additive are essentially the same; thus minimizing the effects of gravity upon separation of the suspension.

A very small quantity of wetting agent or surfactant usually is required, primarily to facilitate wetting of the particles by the salt solution. The surfactant must be one which does not interfere with the polymerization reaction or degrade so as to interfere with the polymer quality, for example by causing discoloration. Less than about 0.2% by weight of the surfactant in the suspension is normally sufficient.

To minimize the amount of suspension which must be added to attain the desired concentration of the additive and to avoid the addition of an unnecessary amount of water, it is preferred that the additive concentration in the suspension be as high as possible. Complications can result, however, from attempting to prepare a suspension being too highly concentrated with the additive. This may result in increased viscosity and a tendency to trap air bubbles in the suspension. This must be avoided. Introduction of entrapped air into the polymerization vessel can result in oxidative degradation of the polymer reactants. A preferred embodiment of this invention comprises the use of a suspension of solid particles of a 1,3,5-trialkyl - 2,4,6 - tri(3,5 - ditertiaryalkyl - 4 - hydroxybenzyl)benzene in a concentrated aqueous solution of hexamethylene diammonium adipate, said solution containing from about 25 to 35% by weight of said salt and the suspension from about 5 to 20% of said phenolic compound.

The following examples illustrate the invention without limiting it in any manner.

EXAMPLE I

The settling phenomenon of 1,3,5 - trimethyl - 2,4,6-tri(3,5 - ditertiarybutyl - 4 - hydroxybenzyl)benzene, a water-insoluble solid having a melting point of about 244° C. and having an average particle size of about 100 to 300 microns, is studied when dispersed in aqueous solutions of varying concentrations of hexamethylene diammonium adipate, nylon salt. The aqueous solution also contains about 0.1% by weight of Zonyl A, (a non-ionic dispersing agent which is a product of E. I. du Pont de Nemours & Co.). In each case the suspension contains 10% by weight of the phenolic antioxidant.

The suspensions are prepared by mixing the antioxidant and the solution under high shear in a blender. Stability of the resulting suspensions is visually observed in settling tubes. Results are shown in the following table:

| Water/Nylon Salt Ratio by Weight in Solution | Wt. percent Salt in 10% Slurry | Particle Behavior |
|---|---|---|
| 50/50 | 45 | Rise. |
| 60/40 | 36 | Do. |
| 65/35 | 31.5 | Do. |
| 70/30 | 27 | Settle. |
| 75/25 | 22.5 | Do. |
| 100/0 | 0 | Do. |

It is seen that the antioxidant particles in the 35% salt solution tend to rise or float whereas at 30% salt concentration or below, the particles tend to settle. Obviously maximum stability of the suspension should result from dispersing the solid within the region of from about 30 to 35% by weight of salt in the aqueous suspension medium.

EXAMPLE II

A 10% by weight suspension of the phenolic antioxidant of Example I is milled in a Hockmeyer Mill at 6000 r.p.m. for 1 hour in an aqueous solution (about 30% by wt.) of hexamethylene diammonium adipate salt. The suspension contains 26.5% by weight of the salt and 0.1% of the nonionic dispersing agent of Example I. The suspension is poured into a settling tube and samples taken for analysis from the bottom of the tube initially after a short presettling period (30 minutes) and again after 8 hours. The initial antioxidant concentration is found to be 10.6% whereas after 8 hours settling it is only 10.8% by weight. A sample prepared without the presence of the hexamethylene diammonium adipate salt by simple stirring in water gives almost complete settling out in about 20 minutes.

Settling rate analysis for another sample prepared in a Hockmeyer Mill as described above, having an initial concentration of 12.0% of the antioxidant, analyzes for 12.3% by weight at the bottom of the tube after 8 hours.

EXAMPLE III

Hexamethylene diammonium adipate is polymerized from aqueous solution in a sealed stirred autoclave in a conventional manner, e.g. as described in U.S. 2,163,636. The reactants are heated maintaining a maximum pressure of 250 p.s.i.g. (18.6 kgm./cm.$^2$), permitting steam to be evolved so as to maintain that pressure, until the reactants reach a temperature off 230° C. At this point essentially all of the initial free water of solution has been removed. Then, in a conventional manner, a sufficient quantity of a 10% by weight suspension of the phenolic antioxidant of Example I, the suspension also containing about 26% by weight of the suspension of hexamethylene diammonium adipate and 64% water (plus 0.1% of Zonyl A) and milled in a manner similar to that described in Example II, is introduced to give a final concentration of the antioxidant in the polymer of 0.3% by weight. No difficulty is encountered in introducing the suspension in the desired amount. The polymerization is continued in a normal manner giving the desired polymer having the desired concentration of the additive.

The suspension can be added to the polymerization mixture immediately prior to the ebullition period when water is being removed under superatmospheric pressure. If the suspension is added too long before the ebullition period, the additive will separate in the polymerization mixture. Preferably, the suspension is added after most of the original water of solution has been removed. To polymerize the salt added with the suspension the suspension must be added before the pressure is reduced to further remove the water produced by the condensation reaction and which occurs before the polymerization mixture attains its final high molecular weight.

The process of this invention provides a convenient means for introducing high melting, water-insoluble, difficultly dispersible organic, additives during the polycarbonamide polymerization process. The need for pulverizing or micronizing the solid organic additive, to attain a sufficiently small particle size to provide an acceptably stable suspension, is eliminated. Since the additive is soluble or compatible with the polymerization melt it dissolves therein and particle size is of no consequence once the additive has been introduced into the melt.

The suspensions prepared have such high stability that no presettling is required in order to assure handling of a uniform suspension. Another benefit is derived by adding a concentrated salt solution instead of a water suspension. Less water is thereby introduced into the polymerization mixture, thus shortening the polymerization cycle.

This invention may be utilized for the addition of appropriate additives to polycarbonamides prepared by melt-polymerization of an aqueous solution of the corresponding diammonium nylon salt. Typically suitable polyamides are described for example in U.S. Pat. 2,130,523, U.S. Pat. 2,130,947, U.S. Pat. 2,130,948 and U.S. Pat. 2,512,606.

Other conventional additives may be introduced during the polymerization in the usual way in addition to the additives herein. Such additives include pigments, viscosity stabilizers, U.V. screeners, other antioxidants such as sodium phenylphosphinate and non-reactive, modifying polymeric additives such as poly(alkylene ethers), antistats etc. These supplemental additives may be introduced before, simultaneously with, or after the addition of other additives according to this invention.

Although specific embodiments of the subject invention have been described and exemplified in the foregoing portion of the specification, it is manifest that diverse equivalent modifications may be effected without deviating from the spirit of the invention or the scope of the annexed claims.

What is claimed is:

1. In the process of preparing a nylon polymer containing a water-insoluble, melt-compatible additive, the improvement comprising adding to a first aqueous solution of a polycarbonamide-forming salt of a diamine and a dicarboxylic acid under high temperature and pressure, within a period from immediately prior to polymerization to before reduction to ambient atmospheric pressure, a suspension of a particulate solid additive in a second aqueous solution of said salt, the amount of said salt in said second aqueous solution being within 5% by weight of the concentration at which the specific gravity of the second aqueous solution is equal to the specific gravity of the said additive, said additive being 1,3,5-trimethyl-2,4,6 - tri(3,5 - ditertiarybutyl - 4 - hydroxybenzyl)benzene.

2. The process of claim 1 wherein the second aqueous solution of said salt contains from about 25% to about 35% of said salt, the percentages expressed being by weight.

References Cited

UNITED STATES PATENTS

| 2,875,171 | 2/1959 | Foster et al. | 260—29.2 |
| 3,026,264 | 3/1962 | Recklin et al. | 260—45.95 |
| 3,341,492 | 9/1967 | Champ et al. | 260—45.95 |
| 3,379,676 | 4/1968 | Ashton et al. | 260—45.95 |
| 3,431,236 | 3/1969 | Davenport et al. | 260—29.2 |

OTHER REFERENCES

German, Gebrauchsmuster 1,924,479, Du Pont & Co., issued Sept. 30, 1965.

SAMUEL H. BLECH, Primary Examiner

U.S. Cl. X.R.

260—29.2, 37, 45.7, 78, 857